LSW009523403B2

United States Patent
Oberti et al.

(10) Patent No.: US 9,523,403 B2
(45) Date of Patent: Dec. 20, 2016

(54) ASSEMBLY CONNECTION FLANGE AND BRAKE DISC

(71) Applicant: FRENI BREMBO, S.p.A., Curno (IT)

(72) Inventors: Leone Oberti, Curno (IT); Gianluigi Maronati, Curno (IT); Nino Ronchi, Curno (IT)

(73) Assignee: FRENI BREMBO, S.P.A., Curno, Bergamo (IT)

( * ) Notice: Subject to any disclaimer, the term of this patent is extended or adjusted under 35 U.S.C. 154(b) by 204 days.

(21) Appl. No.: 14/250,976

(22) Filed: Apr. 11, 2014

(65) Prior Publication Data

US 2015/0015057 A1  Jan. 15, 2015

Related U.S. Application Data

(63) Continuation of application No. PCT/IB2012/055508, filed on Oct. 11, 2012.

(30) Foreign Application Priority Data

Oct. 12, 2011  (IT) .......................... MI2011A001857

(51) Int. Cl.
*F16D 65/12* (2006.01)
*F16D 65/847* (2006.01)
(Continued)

(52) U.S. Cl.
CPC ............... *F16D 65/128* (2013.01); *B60B 3/16* (2013.01); *B60B 21/00* (2013.01); *B60B 23/10* (2013.01);
(Continued)

(58) Field of Classification Search
CPC .... F16D 65/128; F16D 65/123; F16D 65/847; B60B 21/00; B60B 21/021; B60B 3/02; B60B 3/041; B60B 3/14; B60B 3/16; B60B 23/10; B60B 27/0052; B60B 27/0057
See application file for complete search history.

(56) References Cited

U.S. PATENT DOCUMENTS 3,476,224 A * 11/1969 Buching Franz ....... F16D 55/22
                                                              188/218 XL
6,161,661 A * 12/2000 Pahle ..................... F16D 65/123
                                                              188/218 XL
(Continued)

FOREIGN PATENT DOCUMENTS

DE  102 41 867   3/2004
EP  1 162 385   12/2001

OTHER PUBLICATIONS

International Search Report and Written Opinion, mailed Mar. 20, 2013.

Primary Examiner — Kip T Kotter
(74) Attorney, Agent, or Firm — Thomas Horstemeyer, LLP

(57) ABSTRACT

An assembly comprises a flange and a disc, wherein the disc has a brake band and a drum, said drum having an outer drum surface, said drum being suitable for receiving a bearing inside said drum, said disc being arranged between the bearing and said flange, and wherein the flange comprises an inner ring coupled with the disc and an outer ring able to be coupled with a wheel rim, said flange also comprising an intermediate portion having flange through openings defined by an opening edge, said opening edge comprises a radially most inner edge portion, wherein at least one portion of the outer surface of the drum of the disc is arranged radially outside of the edge portion of the flange opening arranged most radially inside.

12 Claims, 9 Drawing Sheets

(51) Int. Cl.
  *B60B 27/00*   (2006.01)
  *B60B 21/00*   (2006.01)
  *B60B 23/10*   (2006.01)
  *B60B 3/16*    (2006.01)
  *F16D 65/02*   (2006.01)

(52) U.S. Cl.
  CPC ....... *B60B 27/0052* (2013.01); *B60B 27/0057* (2013.01); *F16D 65/123* (2013.01); *F16D 65/847* (2013.01); *F16D 2065/1308* (2013.01); *F16D 2065/1328* (2013.01); *F16D 2065/1356* (2013.01); *F16D 2065/1392* (2013.01); *Y10T 29/49526* (2015.01)

(56) References Cited

U.S. PATENT DOCUMENTS

| | | | | |
|---|---|---|---|---|
| 2001/0052725 | A1* | 12/2001 | Koschinat | B60B 3/147 301/6.3 |
| 2004/0016611 | A1* | 1/2004 | Hofmann | F16D 65/123 188/218 XL |
| 2010/0263970 | A1* | 10/2010 | Botsch | F16D 65/123 188/218 XL |
| 2011/0108378 | A1* | 5/2011 | Leone | F16D 65/128 188/218 XL |
| 2013/0133998 | A1* | 5/2013 | Maronati | F16D 65/123 188/218 XL |

* cited by examiner

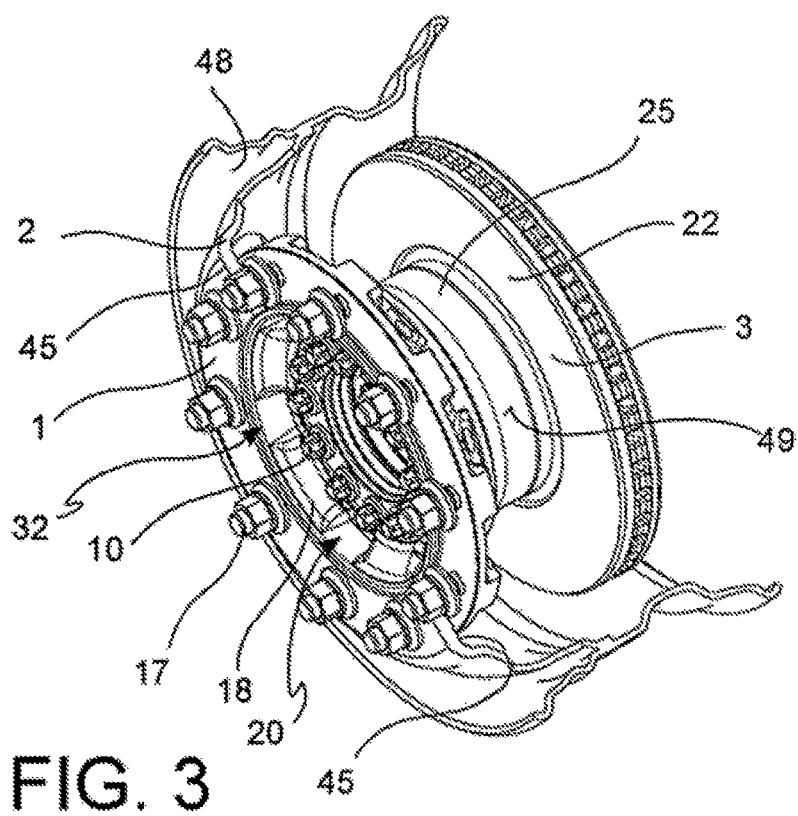
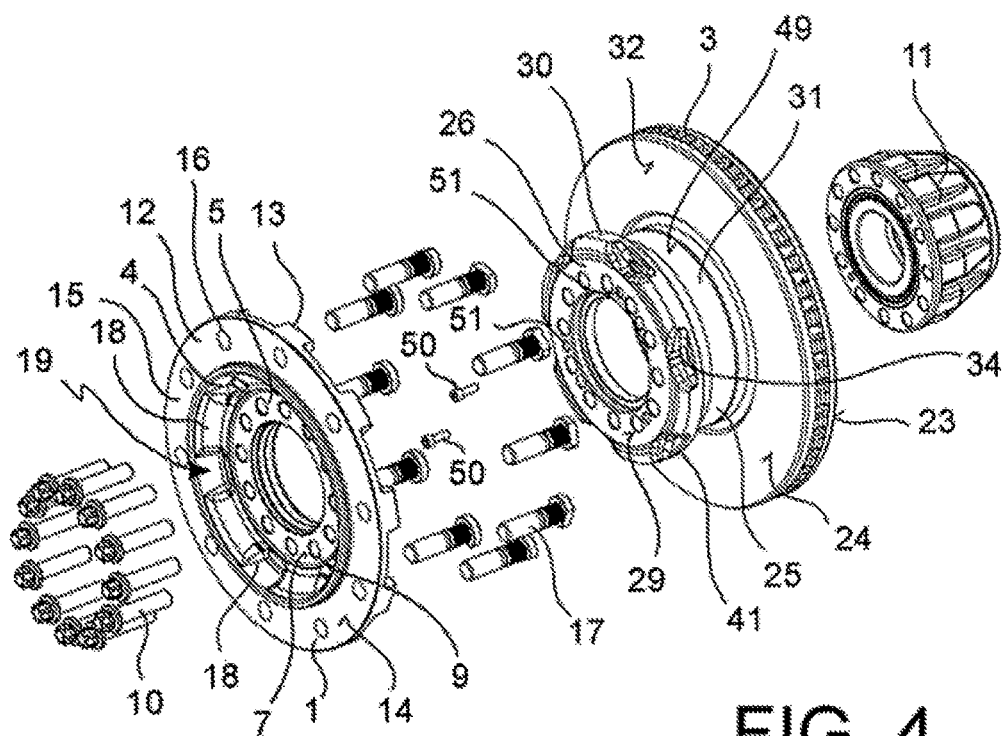

ASSEMBLY CONNECTION FLANGE AND BRAKE DISC

BACKGROUND OF THE INVENTION

1. Field of the Invention

The present invention relates to an assembly of connection flange to a wheel rim and a brake disc.

In particular, the present invention relates to an assembly of connection flange to a wheel rim and brake disc, for example for commercial vehicles.

2. Description of the Prior Art

As it is known, the commercial vehicles have support members of the wheel rims, or hubs, comprising bearings that are sufficiently robust to be able to support high transport loads.

Typically, these hubs are connected to axles or traction axles, or motors, which allow a free rotation of the bearing, and therefore of the wheel rim connected thereto, or the transmission of a torque.

In the case that these hubs are used for commercial vehicles, the housed bearings have to support even very high loads. Although the friction between the axle and the hub is particularly limited, by virtue of the use, for example, of volving bearings, for example roll bearings, in the case that the action to be transmitted through the bearing is particularly high, a considerable heating of the bearing and of all the components contiguous thereto is created. This heating has to be suitably dissipated in order not to compromise the proper operation of the bearings housed in the hub and therefore, possibly, of the disc for disc brake that is connected thereto.

Also the braking system determines, when it is actuated, a particular heat production. In fact, the braking action of the vehicle converts, by virtue of the friction between its components, the kinetic energy into thermal energy. The fact that the disc for disc brake is connected to the support hub of the wheel rim, determines, in the case of repeated and intense braking actions, for example in the case that the vehicle has to go downhill of a mountain pass, a great increase in the temperature of the disc for disc brake and also of its portions connected to the hub, and in particular to the bearing, thus causing an even considerable heating of the bearing housed therein. In the case that the brake disc is not suitably cooled, it is possible to compromise the proper operation not only of the disc, but also of the bearing.

Therefore, the need of devising and providing a solution that allows a suitable cooling not only of the disc for disc brake, but particularly of the interface between the disc for disc brake and the bearing received therein is particularly felt.

Solutions that have means for the passage of cooling air through the wheel rim are known, in particular the connection flange between the hub and the wheel rim.

For example, the document EP 1 162 385 by SAF Holland GmbH has an assembling apparatus for a wheel that comprises a hub wheel and a flange having a wheel assembling portion to be connected to the wheel, and having a hub assembling portion to be connected to a hub wheel. Ventilation passages are provided for between the wheel assembling portion and the hub assembling portion.

This solution has considerable drawbacks, because it allows the passage of cooling air through openings of the hub and rim connection flange by evacuating the heat developed by the braking surfaces, particularly the braking surface facing the rim, but in no way it can concur to the cooling of the heat developed by the bearing, or transmitted to the bearing, through the drum from the brake disc.

Other solutions of hub and rim connection flange openings are known from the documents U.S. Pat. No. 3,952,820 by SKF Nova A.B. and from the document U.S. Pat. No. 5,921,633 by Fag Automobiltechnik AG, which however have the drawbacks of the solution EP 1 162 385.

Therefore, it is particularly felt the need of manufacturing a disc flange assembly for disc brake that allows a suitable cooling not only of the disc, but also of the bearing, and in particular that allows a suitable evacuation of the cooling fluid.

SUMMARY OF THE INVENTION

Therefore, it is the object of the present invention to devise a connection flange to a wheel rim and a flange and brake disc assembly that allows solving the drawbacks of the state of the art, while allowing a suitable cooling of the bearing and of the brake disc, as well as providing a solution simple to be implemented and easy in maintenance that prevent the direct connection of the brake disc to the wheel rim.

In accordance with a general embodiment, an assembly comprises a flange and a disc, wherein said disc has a brake band and a drum. Said drum has an outer drum surface. Said drum is suitable for receiving internally a bearing so that said disc is interposed between said bearing and said flange. The flange comprises an inner ring coupled with the disc and an outer ring able to be coupled with a rim wheel. Said flange also comprises an intermediate portion having flange through openings and defined by an opening edge, which comprises its radially most inner edge portion, that is, closer to the axis of symmetry of the flange and/or of the disc. Preferably, at least one portion of the outer surface of the disc drum is arranged radially more outside with respect to the edge portion of the flange opening arranged most radially inside.

In accordance with a still further general embodiment, an assembly comprises a connection flange of a wheel rim to a brake disc. Said flange comprises an annular body extending around an axis of symmetry. Said body comprises an inner ring suitable for connecting to the brake disc and having a first surface extending substantially radially and facing the disc and a second surface opposite the disc. Said inner ring comprises a disc coupling portion. Said flange body also comprises an outer ring suitable for connecting to the wheel rim and having a third surface extending substantially radially and facing the disc, as well as a fourth surface opposite the disc and facing the wheel rim. Said outer ring also comprises a rim coupling portion. Said flange body also comprises an intermediate joining portion between said inner ring and said outer ring, wherein said intermediate portion comprises a plurality of flange through openings that are distributed circumferentially. Said plurality of openings has an opening edge, and each of said openings has a radially inner portion that defines the opening towards the axis. Said assembly also comprises a disc for disc brake arranged around a rotation axis. Said disc comprises a brake band that extends around said rotation axis and forms two opposite braking surfaces suitable for cooperating with pads of a brake caliper arranged astride of said brake band. Said disc also comprises a drum, which comprises a drum connection flange having a connection portion suitable for connecting the drum to a bearing housed in it. Said connection portion of said connection flange comprises a surface facing the bearing and an opposite surface facing the flange, so as to leave said disc with its connection flange between said bearing and the connection flange to the wheel rim. Said drum also comprises a corner or edge portion that is arranged radially outside the connection portion. Said drum also comprises a drum body that connects said edge to the brake band that defines a space outside the drum, for example a space comprised between the drum and the wheel rim, or the outside of the wheel rim, and internally defines a gap between the drum and the bearing housed in it. This gap runs axially substantially along the entire drum until it reaches said edge. Preferably, said edge defines at least one drum opening that brings the gap, present from the drum body of the bearing, in communication with the outside of the drum, and in particular, the flange opening. Said drum opening has a radially inner portion of drum opening edge. Preferably, one of said openings of said plurality of flange openings has its radially inner portion of the opening edge substantially aligned radially or with substantially the same distance from the axis of symmetry with respect to radially inner portion of the opening edge of the drum opening.

By virtue of the provision of an outer drum surface radially more outside with respect to the lower or radially inner edge of the flange opening, it is possible to bring part of the drum in communication with the opening of the cooling fluid evacuation flange, allowing the cooling of the bearing as well as the cooling of the brake disc.

Furthermore, by virtue of the provision of a drum for brake disc, on the edge of which an opening is foreseen for the evacuation of the cooling fluid from the gap inside the drum that separates it from the bearing outside the rim, passing through the flange opening, it is possible to suitably cool also the inside of the drum, and therefore directly also the bearing, bringing it in direct communication with the outside of the wheel rim.

Furthermore, by virtue of the described solutions, it is possible to disassemble the wheel without separating the flange from the rim, so as to make particularly easy and rapid the possible replacing of the worn disc.

Furthermore, in accordance with an embodiment, the number of the flange openings is equal to the number of the openings foreseen on the drum edge, reducing the total number of flange openings and making the latter much more resistant to the stresses that are present, for example, in the commercial vehicles. At the same time, the foreseen solution allows having a flange body, and particularly a disc coupling inner ring thereof, in a lighter weight, but at the same time sufficiently robust, since it is coupled with a large extension or connection portion thereof to the drum flange, thereby being a thin flange inner ring, yet suitably robust, while allowing a lightening of the assembly on the whole.

By virtue of the proposed solution, it is possible to free the brake disc from the wheel rim and interpose it between the flange and the bearing, while preserving a suitable ventilation of the bearing, allowing the evacuation of cooling fluid from the gap between the bearing and the disc directly outside the wheel.

These and further objects are achieved by an assembly as described in the claim 1 annexed herein.

BRIEF DESCRIPTION OF THE DRAWINGS

Various embodiments of the invention will be now described below, by means of implementation examples, that are given by way of non-limiting example only, with reference to the annexed Figures, in which:

FIG. 3 represents, in an axonometric view partially in section, the assembly of FIG. 1 according to a further point of view;

FIG. 4 represents, with separated parts, the assembly composed of a disc for disc brake, a connection flange of the disc to the rim and a bearing that can be housed inside the disc drum;

DETAILED DESCRIPTION OF THE PREFERRED EMBODIMENTS

Figure 1:
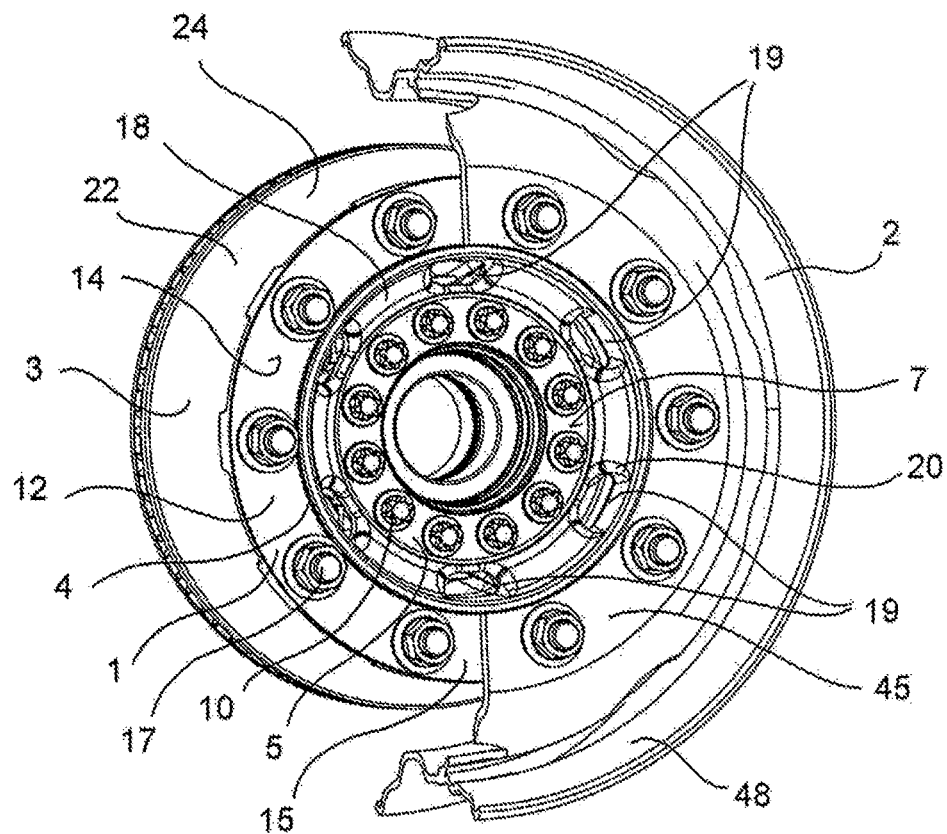
FIG. 1 represents, in an axonometric view partially in section, an assembly composed of a disc for a disc brake, a connection flange of the disc to the rim, as well as a wheel rim partially in section in order to better highlight the disc flange.
Figure 2:
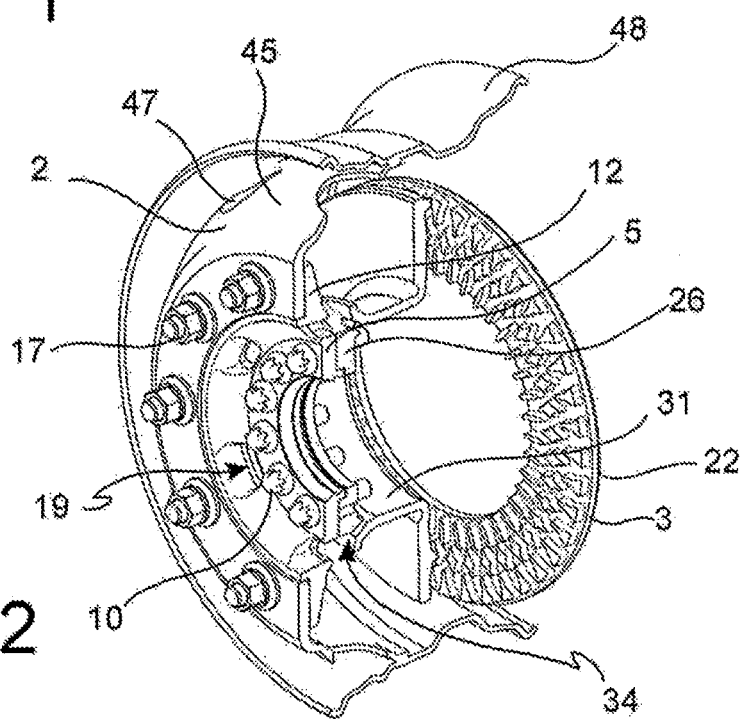
FIG. 2 represents an axonometric view of a cross-section of the assembly of FIG. 1.
Figure 5:
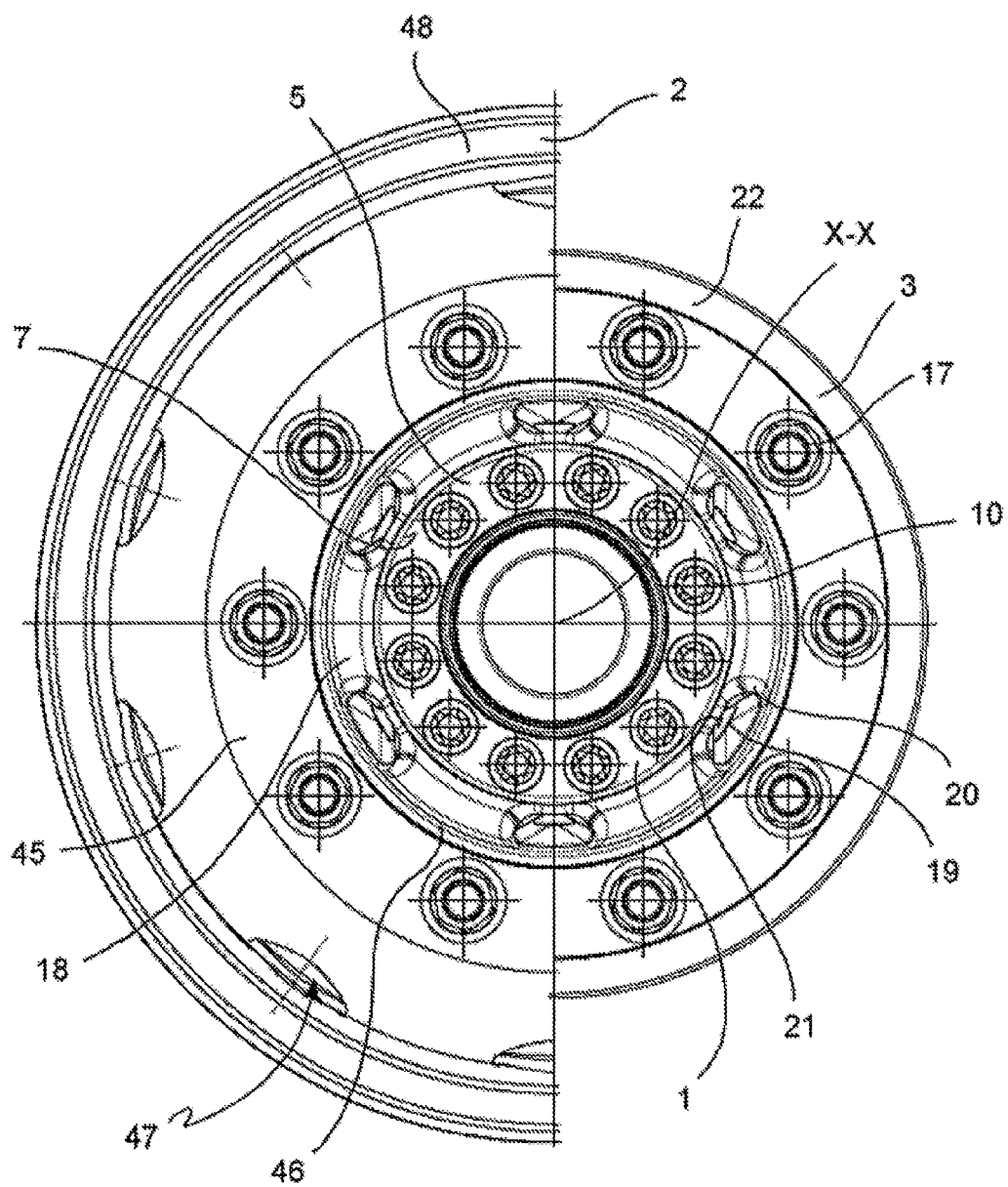
FIG. 5 represents a front view of an assembly of a disc for disc brake connected to a connection flange and a wheel rim partially in section.
Figure 6:
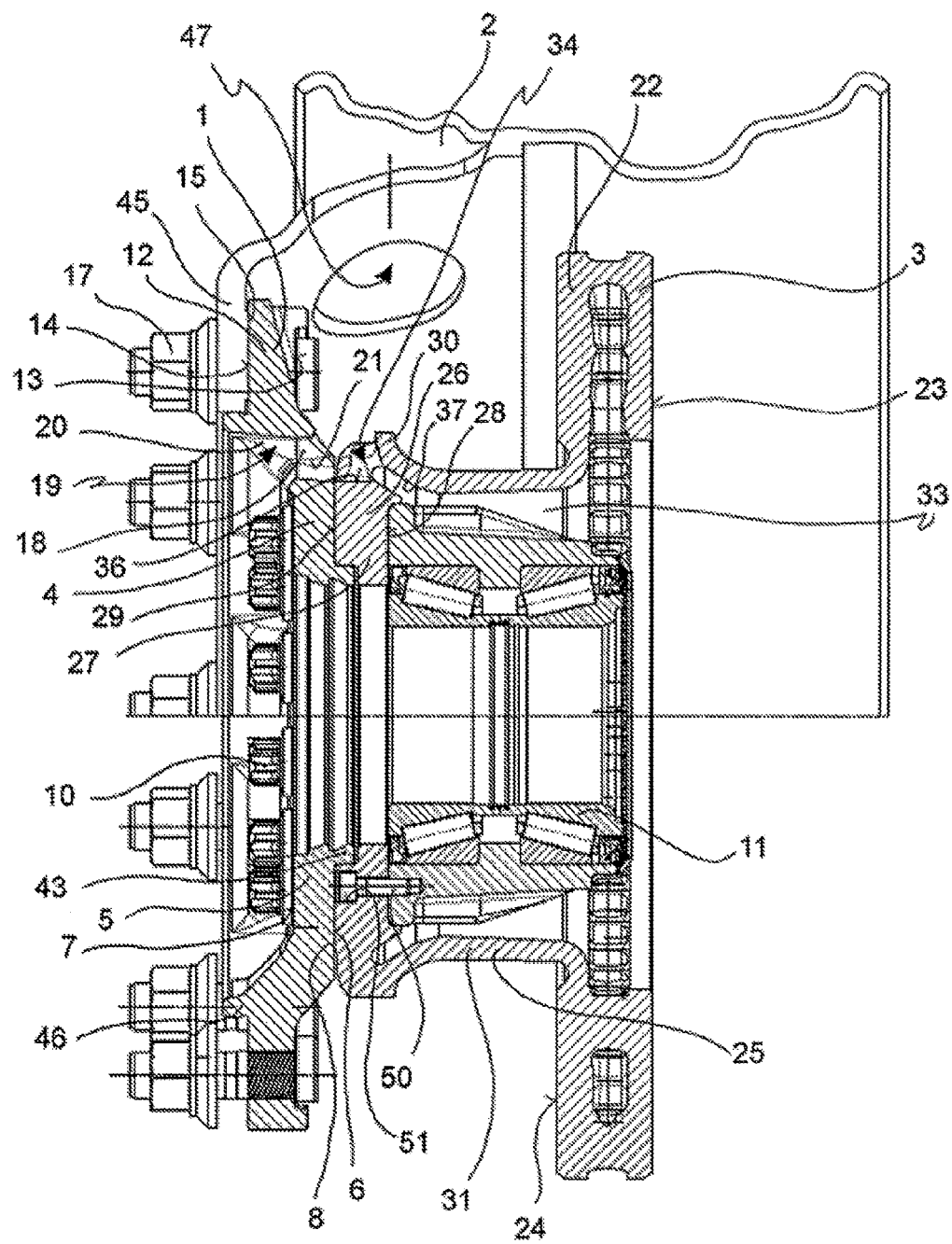
FIG. 6 represents a cross-section of the assembly of FIG. 5.
Figure 7A:
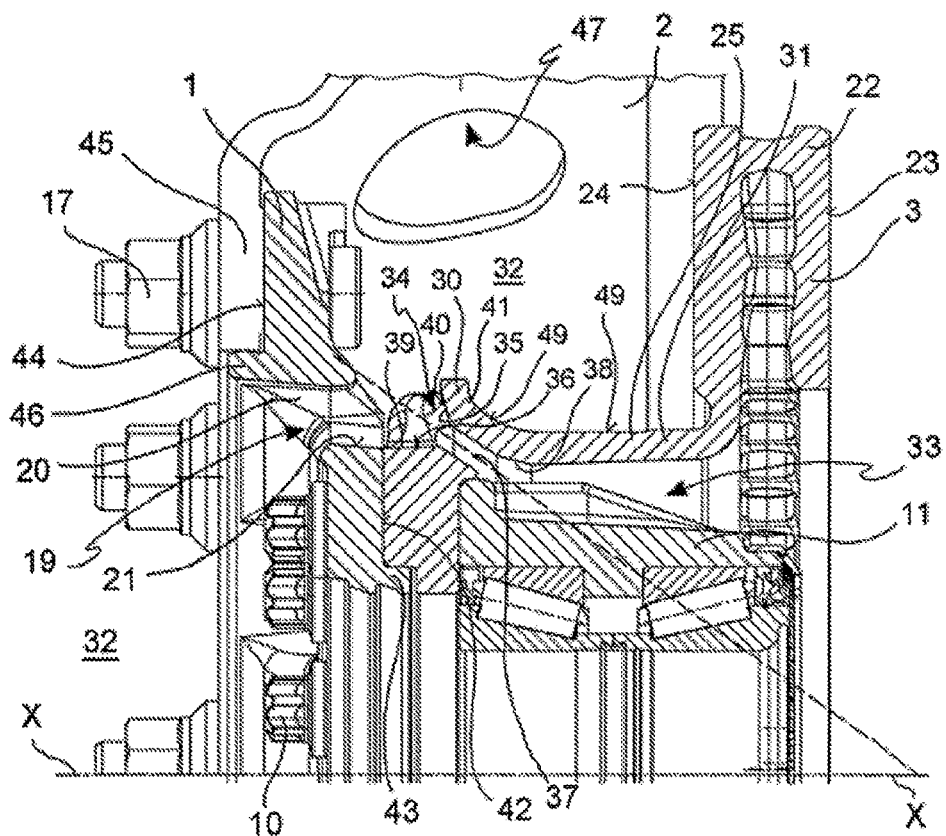
FIG. 7A and FIG. 7B represent an enlarged detail of the assembly of FIG. 6.
Figure 7B:
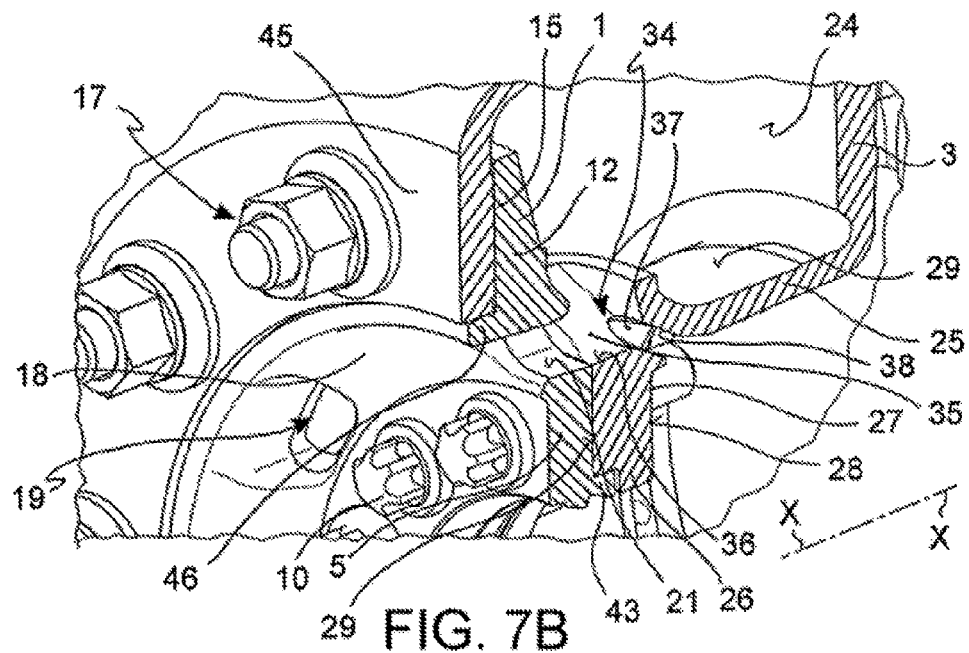
Figure 8:
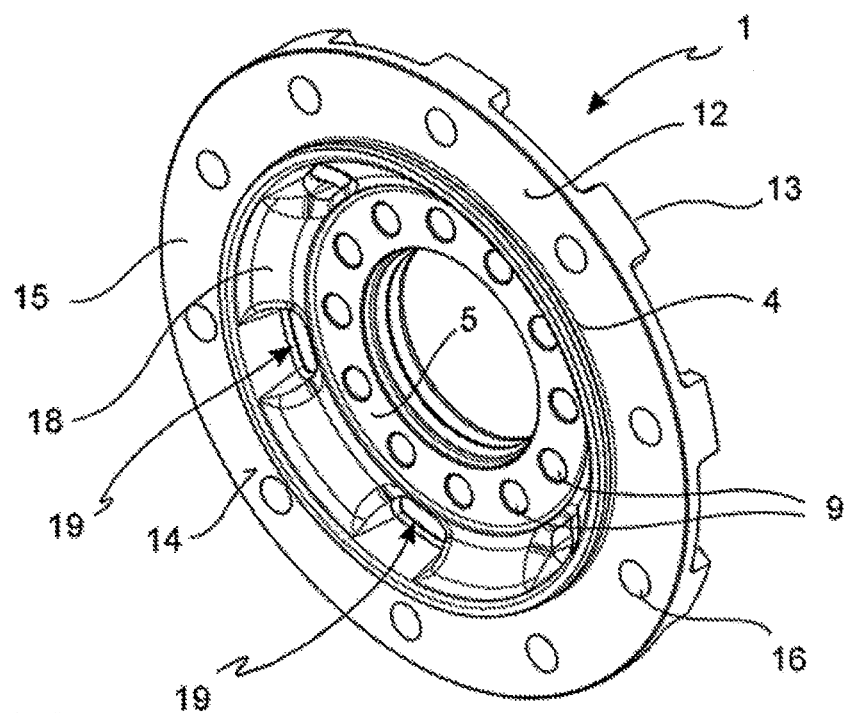
FIG. 8 represents an axonometric view of a connection flange of a disc to a rim.
Figure 9:
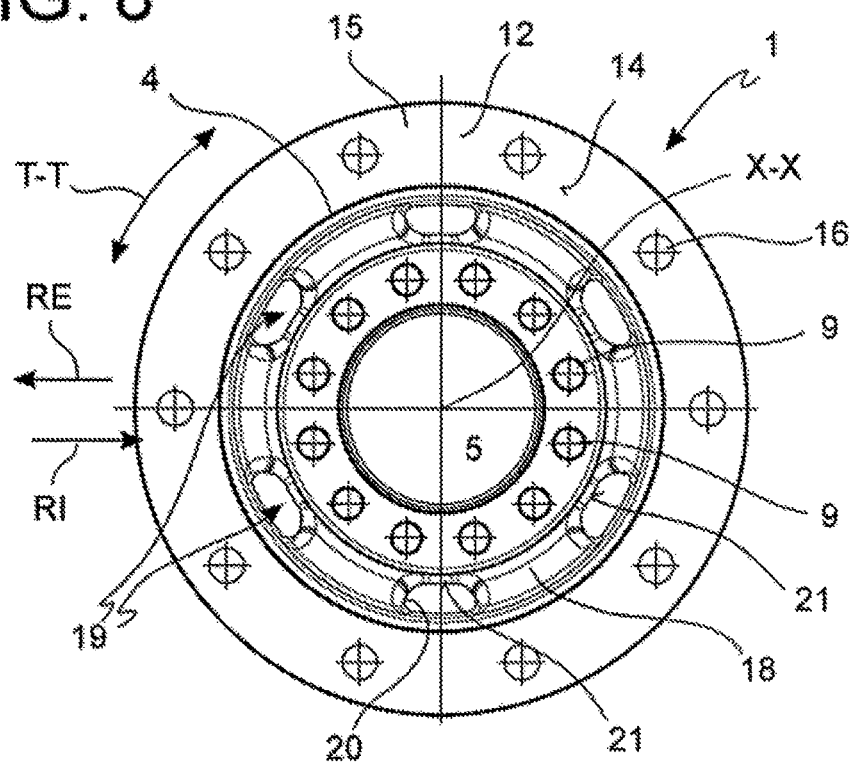
FIG. 9 represents a front view of the flange of FIG. 8.
Figure 10:
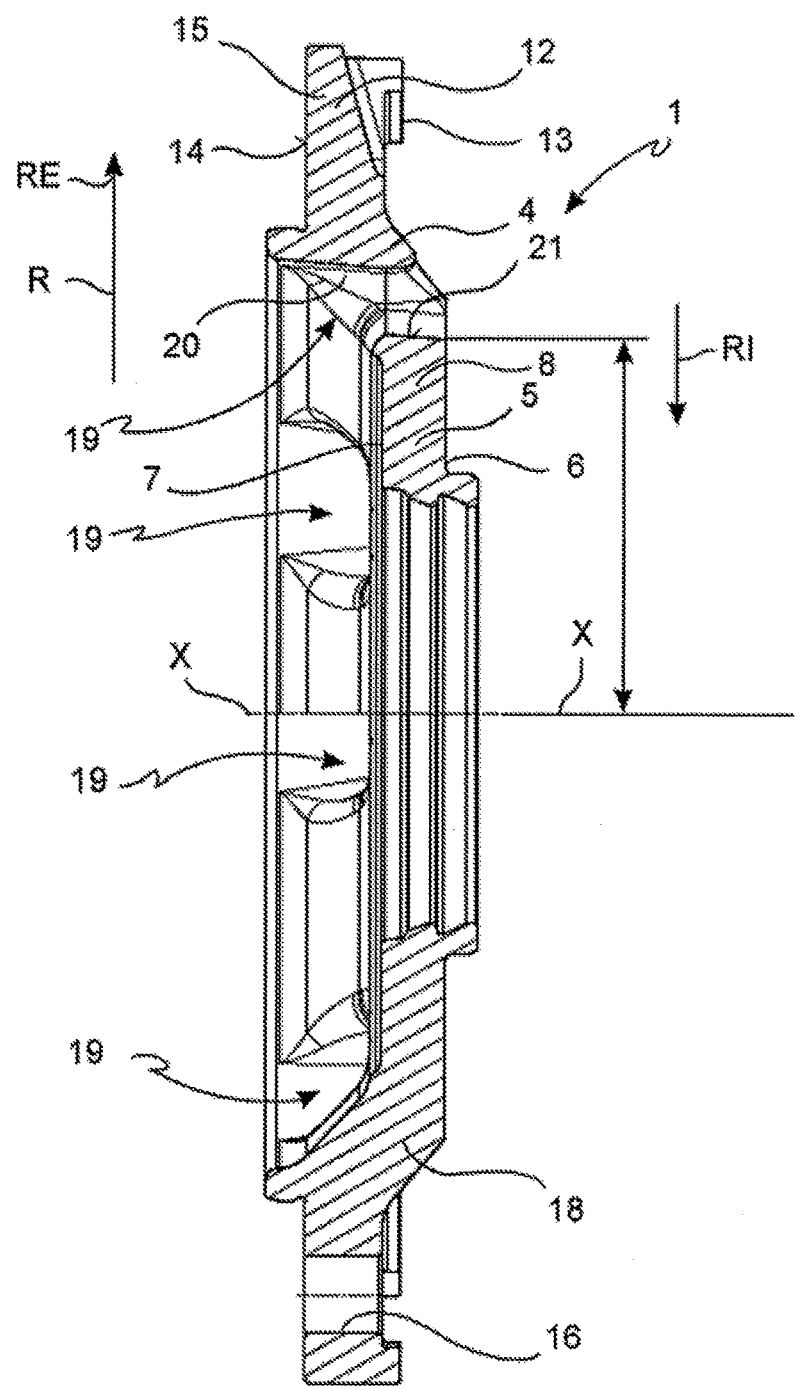
FIG. 10 represents a cross-section of the flange of FIG. 8.
Figure 11:
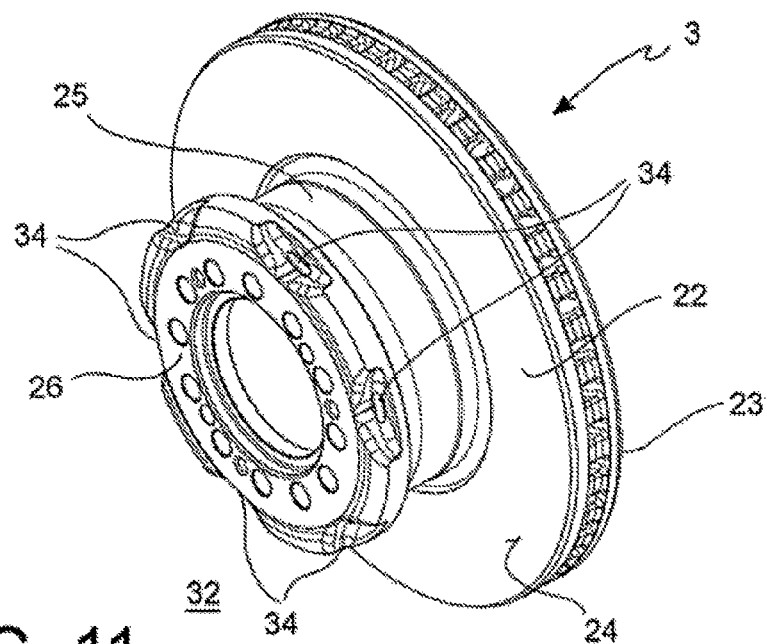
FIG. 11 represents an axonometric view of a disc for disc brake.
Figure 12:
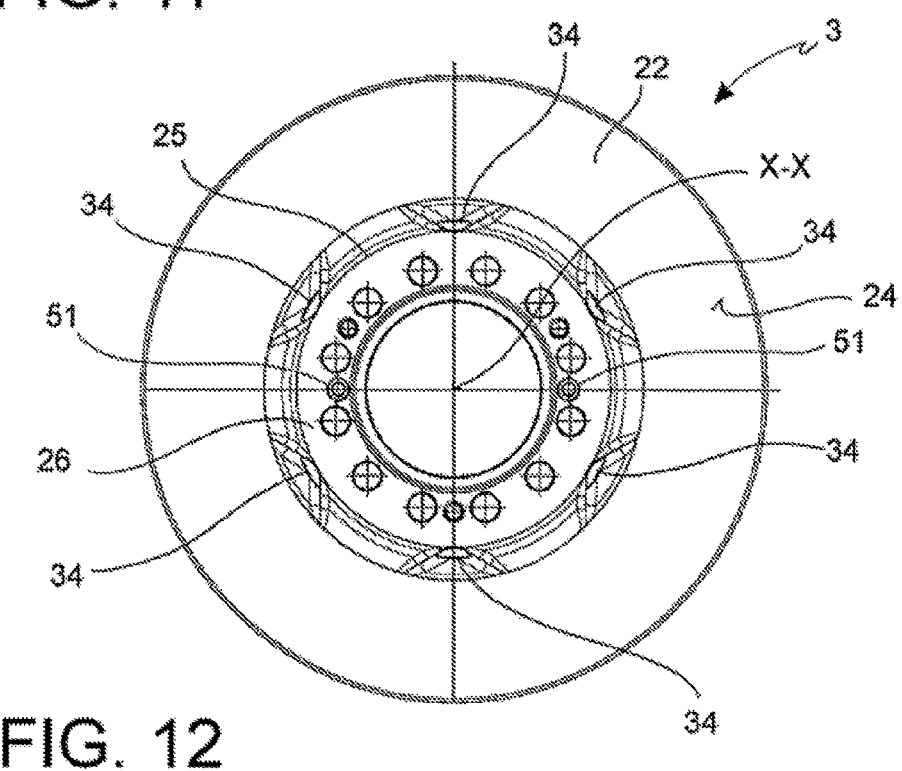
FIG. 12 represents a front view on the wheel side of the disc of FIG. 11.
Figure 13:
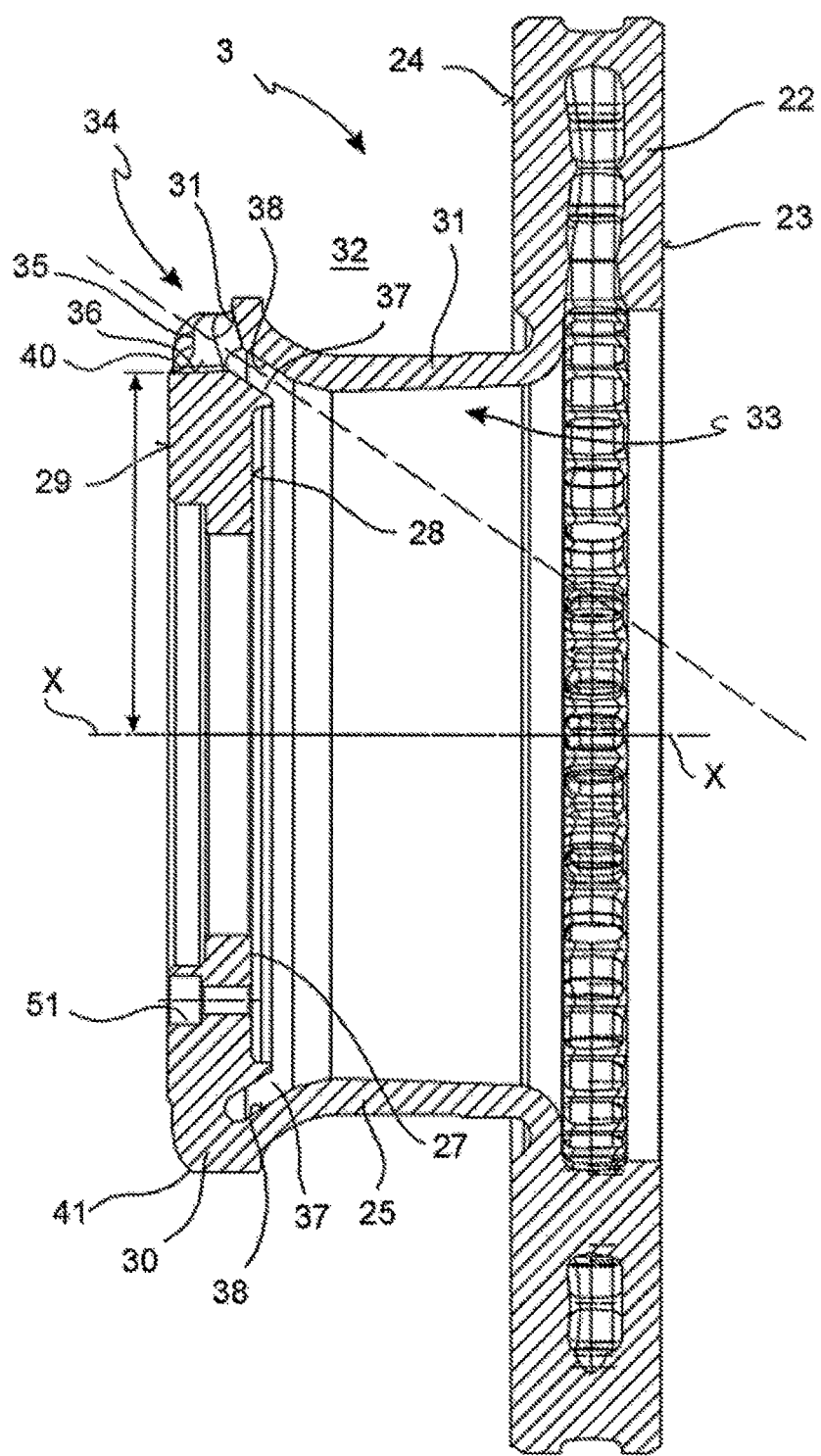
FIG. 13 represents a cross-section of the disc of FIG. 11.

As it is possible to see from the annexed Figures, in accordance with a general embodiment, an assembly comprises a connection flange or flange 1 and a disc or disc for disc brake 3.

In accordance with an embodiment, the disc 3 has a brake band 22 suitable for cooperating with a caliper for disc brake to exert a braking action on a vehicle. Said disc 3 also comprises a drum 25. Said drum 25 has an outer drum surface 49. Said drum 25 is suitable for receiving a bearing 11 inside said drum, which is suitable to be shrunk on a shaft or an axle of the vehicle.

In accordance with a preferred embodiment, said disc 3 is interposed between the bearing 11 and the connection flange 1, and in accordance with an embodiment, said disc is able to be firmly connected to the bearing so as to allow separating the connection flange 1 without separating the disc from the bearing.

In accordance with an embodiment, the flange 1 comprises an inner ring 5. Said inner ring 5 is coupled with the disc 3. Said flange 1 also comprises an outer ring 12 able to be coupled with a wheel rim 2.

In accordance with a preferred embodiment, said connection flange 1 also comprises an intermediate portion 18 that has flange through openings 19, that is, that is able to bring a side of the flange in communication with the other side of the flange, that is, suitable for bringing the inside of the wheel in communication with the outside of the wheel. Said flange openings 19 are defined by an opening edge 20, which comprises a radially most inner edge portion 21, or edge portion nearer to the axis of symmetry X-X of the connection flange 1.

In accordance with an embodiment, said disc 3 is an axial-symmetric body with respect to an axis of symmetry X-X that preferably coincides with the rotation axis of the shaft or axle of the vehicle. In accordance with an embodiment, said connection flange 1 has an axial-symmetric body with respect to an axis of symmetry X-X that, advantageously, coincides with the axis of symmetry of the disc 3, which coincides with the rotation axis of the axle or axis of the vehicle.

In accordance with a preferred embodiment, at least one portion of the outer surface 49 of the drum of the disc 3 is arranged radially in a position outside with respect to the edge portion 21 of the flange opening 19 that is arranged most radially inside.

In accordance with a general embodiment, an assembly comprises a connection flange 1 of a wheel rim 2 to a brake disc 3. Said flange 1 comprises in particular an annular body 4 extending around an axis of symmetry X-X.

In accordance with an embodiment, said body 4 comprises an inner ring 5 suitable for connecting to a brake disc 3 and having a first surface 6 extending substantially radially facing the disc 3, as well as a second surface 7 opposite the disc 3. In accordance with an embodiment, said inner ring 5 comprises a disc coupling portion 8.

In accordance with an embodiment, said inner ring 5 has a plurality of through holes 9 suitable for receiving coupling means 10 of the flange 1 to the disc 3, as well as for connecting to the bearing 11 received in said disc 3.

In accordance with an embodiment, said body 4 also comprises an outer ring 12 suitable for connecting to a wheel rim 2 and having a third surface 13 extending substantially radially and facing the disc 3, as well as a fourth surface 14 opposite the disc 3 and facing the wheel rim 2.

In accordance with an embodiment, said outer ring 12 comprises a rim coupling portion 15. In accordance with an embodiment, said outer ring 12 also comprises a plurality of through holes 16 suitable for receiving connection means of the wheel rim 2 to the flange 17.

In accordance with an embodiment, said body 4 comprises an intermediate joining portion 18 between said inner ring 5 and said outer ring 12. In accordance with an embodiment, said intermediate portion 18 comprises a plurality of flange openings 19. Said flange openings 19 are through openings, that is, they bring a side of the flange in communication with the opposite side of the flange or, in other words, they bring the inside of the wheel in communication with the outside of the wheel. Said flange openings 19 are, preferably but not necessarily, distributed circumferentially around said axis X-X.

In accordance with an embodiment, each of said openings of said plurality of openings 19 has an opening edge 20. Each of said openings 19 comprises a radially inner edge portion 21 that defines the opening towards the axis X-X.

In accordance with an embodiment, said assembly also comprises a disc for a disc brake 3. Said disc 3 is arranged around a rotation axis X-X and comprises a brake band 22 that extends around said rotation axis X-X and forms two opposite braking surfaces 23, 24 suitable for cooperating with pads of a brake caliper arranged astride of said brake band.

In accordance with an embodiment, said disc 3 defines an axial direction X-X coinciding with or parallel to said rotation axis X-X. Said disc also defines a radial direction R-R, which defines a radially outer direction RE when going away from said axial direction X-X, as well as a radially inner direction RI when going towards said radial direction X-X, as well as a circumferential direction T-T perpendicular to said axial direction X-X and said radial direction R-R.

In accordance with an embodiment, said disc 3 also comprises a drum 25. Said drum 25 comprises a connection flange drum 26 having a connection portion 27 suitable for connecting the drum 25 to a bearing 11.

In accordance with an embodiment, said connection portion 27 of said connection flange 26 comprises a surface 28 facing the bearing 11 and an opposite surface 29 facing the flange 1.

In accordance with an embodiment, said disc 3 is, for example with its connection flange 26, between said bearing 11 and the connection flange 1 for the connection to the wheel rim.

In accordance with an embodiment, said drum 25 also comprises a corner or edge portion or angle 30 of drum. In accordance with an embodiment, said edge portion or angle 30 of drum 25 is a ridge that extends radially going away from the axis X-X.

In accordance with an embodiment, said drum 25 also comprises a drum body 31, which connects said edge 30 to the brake band 22.

In accordance with an embodiment, said drum body 31 defines an outer space 32 comprised between the drum 25 and for example the wheel rim 2 or the outside of the wheel rim 2.

In accordance with an embodiment, the drum body 31 is suitable for creating a gap 33 between itself and the received bearing 11. In accordance with an embodiment, said gap 33 runs axially, for example according to the axial direction X-X, substantially along the entire drum 25 until it reaches said edge 30 and allowing the cooling fluid to lap substantially the entire bearing 11.

In accordance with an embodiment, said edge 30 defines at least one drum opening 34 that places the gap 33 present between the body drum 31 and the bearing 11 in communication with the outside of the drum 32, as well as through the flange opening 19 with the outside of the wheel. In accordance with an embodiment, said drum opening 34 has a radially inner portion 36 of edge 35 of drum opening 34.

In accordance with a preferred embodiment, at least one of said openings of said plurality of openings 19 of the flange 1 has its radially inner portion 21 of the opening edge 20 substantially radially aligned, or with substantially the same distance from the axis X-X, with respect to the radially inner portion 36 of the opening edge 35 of the drum opening 34.

In accordance with an embodiment, said drum opening 34 is a plurality of drum openings 34, for example a plurality of drum openings 34 distributed circumferentially around said axis X-X.

In accordance with an embodiment, said drum opening 34 is joined to a drum duct 37 having at least one wall 38 inclined with respect to the axis X-X. In accordance with an embodiment, said wall inclined 38 is a radially outer wall to the duct 37 with respect to the axis of the disc X-X forming a frustoconical-shaped drum body portion.

Advantageously, said duct, radially widening and passing from the gap to the drum opening 34 during the rotation of the disc, causes a centrifugal action on the cooling fluid that laps the bearing, thus forcing an evacuation movement of the cooling fluid from the gap towards the drum opening, and then, through the flange opening, towards the outside of the wheel.

In accordance with an embodiment, said duct 37 is annular in shape, for example with a shape that is coaxial to said axis X-X.

In accordance with an embodiment, said at least one drum opening 34 is defined by opening walls 39, 40 that have in their radially outer portions with respect to the axis of the disc X-X at least one inclined section that defines a supply and joining duct arranged between the gap 33 and the at least one opening 34. In accordance with an embodiment, said duct tapers radially, thus creating a centrifugal action on the cooling fluid that from the gap 33 is drawn towards the opening 34.

In accordance with an embodiment, said inclined section 38 is a plurality of inclined sections having increasing inclination passing from the gap 33 to the opening 34 to form a channel that goes away from the rotation axis of the disc X-X.

In accordance with an embodiment, the walls 39, 40 defining said opening 34 have at least one second wall section 36 or radially inner portion, having a direction parallel to the direction of the axis X-X. In accordance with an embodiment, said section 36 parallel to the axial direction is opposite said inclined section to form an opening mouth 34 towards the outside of the disc with walls diverging from one another.

In accordance with an embodiment, said disc is used in a motor vehicle, in particular a commercial vehicle, having a cup-shaped drum 25 and an annular brake band 22 that extends to said drum 25. In accordance with an embodiment, said disc has an annular ridge 41 on the outer peripheral surface of the drum 25 extending from said drum, for example but not necessarily at said edge 30.

In accordance with an embodiment, at least one guide duct for cooling fluid 37 is formed in said annular ridge 41 that guides said fluid from said gap 33 to the space outside of the drum 25, which surrounds the outer drum surface.

In accordance with an embodiment, said flange 1 has a number of flange openings 19 that is equal to the number of drum openings 34. In accordance with an embodiment, there are six of said flange openings 19 and there are six of said drum openings 34.

In accordance with an embodiment, said flange openings 19 and said drum openings 34 have their radially inner opening portion 21, 36 aligned with each other substantially on the same cylindrical surface, substantially equally spaced from said axis X-X.

In accordance with an embodiment, said flange openings 19 and said drum openings 34 have the same circumferential or tangential extension along the circumferential direction T-T.

In accordance with an embodiment, said disc is connected to the bearing by stud bolts 50 so as to separate the flange from the disc, leaving the disc firmly coupled with the bearing.

In accordance with an embodiment, the drum flange has through seats or through holes suitable for receiving stud bolts 50 that come out from said drum towards the inside of the drum for connecting in threaded holes provided for in the bearing, for example, but not necessarily in the outer fifth wheel of the bearing.

In accordance with an embodiment, the seats of the drum flange are built-in seats 51 suitable for receiving the screws completely or in a rollaway manner, so that they do not come out of the drum, avoiding the interference in the coupling between the drum and the connection flange 1 to the rim 2.

In accordance with an embodiment, said disc coupling portion 8 of said flange 1 forms a seat 42 suitable for receiving the drum flange 26.

In accordance with an embodiment, said disc coupling portion 8 is defined radially and internally by a disc guide edge 43 for guiding and centering the drum flange 26, provided for example with an annular ridge forming a counter-guide inner edge.

In accordance with an embodiment, said rim coupling portion 15 of said flange 1 forms a rim seat 44 suitable for receiving a portion of a rim flange 45 for its connection to the connection flange 1.

In accordance with an embodiment, said rim coupling portion 15 is defined radially and internally by a rim edge 46 for guiding and centering the rim flange 45, which, for example, will be equipped with unloaded corners and a ridge facing the connection flange 1 that is suitable for a connecting, for example, having a preset planar geometric tolerance, as well as with a counter-guide inner edge.

In accordance with an embodiment, said assembly also comprises a wheel rim 2. In accordance with an embodiment, said wheel rim 2 comprises a channel 48 suitable for cooperating for example with a tyre. Said channel is firmly connected to a rim flange 45 suitable for connecting said channel 48 with the connection flange 1. In accordance with an embodiment, said rim flange 45 is equipped with rim through openings 47 that are able to evacuate the cooling fluid.

A method of assembling of the assembly is described below.

In accordance with a use embodiment, a method for mounting a flange-disc assembly to a bearing comprising the steps of:
providing an assembly in accordance with one of the embodiments described above;
fitting the disc for disc brake 3 over the bearing 11 by inserting the bearing inside the drum 25 of the disc until the connection flange of the disc drum 26 is brought in contact with a fifth wheel of the bearing 11;
aligning a seat 51 for a stud bolt 50 with the threaded seat of the bearing;
fitting at least one stud bolt 50 and firmly connecting the disc to the bearing;
fitting the disc-rim connection flange 1 by coupling its inner flange ring 5 with the disc 3;
firmly connecting the flange to the disc and to the bearing, inserting the flange-disc-bearing connection means 10.

In accordance with a use embodiment, said method also comprises the step of:
connecting a wheel rim 2 to the flange 1, and comprises the steps of
fitting the rim flange 45 on the outer ring 12 of the connection flange 1;
firmly connecting the rim 2 and the connection flange 1 through the rim and flange connection means 17.

In accordance with a use embodiment, the method comprises steps of replacing a worn brake disc 3, said method comprising the steps of
preventing the rim 2 from being decoupled from the connection flange 1, preventing the flange-disc-bearing connection means 10 from being disconnected by separating the connection flange 1 from the disc 3;
subsequently disconnecting the disc 3 from the bearing 11 by unscrewing the stud bolts 50;
withdrawing the worn disc 3 from the bearing.

To the preferred implementation solution of the devices described above, those skilled in the art, with the aim of meeting contingent, specific needs, will be able to make a number of modifications, adaptations, and replacements of elements with other ones that are functionally equivalent, without for this departing from the scope of the following claims.

| REFERENCES | |
|---|---|
| 1 | Connection flange |
| 2 | Wheel rim |
| 3 | Disc for disc brake |
| 4 | Flange annular body |
| 5 | Flange inner ring |
| 6 | Inner ring first surface |
| 7 | Inner ring second surface |
| 8 | Disc coupling portion |
| 9 | Inner ring through holes |
| 10 | Flange-disc-bearing connection means |
| 11 | Bearing |
| 12 | Flange outer ring |
| 13 | Outer ring third surface |
| 14 | Outer ring fourth surface |
| 15 | Rim coupling portion |
| 16 | Outer ring through holes |
| 17 | Rim and flange connection means |
| 18 | Flange intermediate portion |
| 19 | Flange through opening |
| 20 | Opening edge |
| 21 | Opening edge radially inner portion |
| 22 | Brake band |
| 23 | Braking surface |
| 24 | Opposite braking surface |
| 25 | Drum |
| 26 | Drum connection flange |
| 27 | Bearing connection portion |
| 28 | Bearing facing surface |
| 29 | Flange-facing surface opposite to bearing |
| 30 | Drum edge or corner |
| 31 | Drum body |
| 32 | Drum outer space |
| 33 | Gap between drum and bearing |
| 34 | Drum opening |
| 35 | Drum opening edge |
| 36 | Drum opening radially inner portion |
| 37 | Inclined drum duct |
| 38 | Inclined duct wall |
| 39 | Drum opening walls |
| 40 | Drum opening walls |
| 41 | Drum annular ridge in the drum edge |
| 42 | Flange seat for disc drum flange |
| 43 | Disc guide edge |
| 44 | Flange seat for rim flange |
| 45 | Rim flange portion connected to flange |
| 46 | Rim centering and guiding portion |
| 47 | Rim through openings |
| 48 | Rim channel |
| 49 | Drum outer surface |
| 50 | Disc to bearing connection bolts |
| 51 | Seat for built-in screw for screw head |

The invention claimed is:

1. An assembly comprising:

a connection flange and a brake disc;

wherein said connection flange comprises an annular body extending around an axis of symmetry, said annular body comprising an inner ring suitable for connecting to said brake disc and having a first surface extending substantially radially and facing said brake disc and a second surface opposite said brake disc, said inner ring further having a disc coupling portion, said body further comprising an outer ring suitable for connecting to a wheel rim and having a third surface extending substantially radially and facing said brake disc and a fourth surface opposite said brake disc and facing the wheel rim, said outer ring further having a rim coupling portion, said annular body further comprising an intermediate joining portion positioned between said inner ring and said outer ring, said intermediate portion having a plurality of through openings distributed circumferentially, said through openings each having an opening edge that includes a radially inner portion that defines said opening towards said axis of symmetry;

wherein said brake disc is arranged around a rotation axis and comprises a brake band that extends around said rotation axis, said brake band forming two opposite braking surfaces suitable for cooperating with pads of a brake caliper arranged astride of said brake band, said brake disc defining an axial direction coinciding with or parallel to said rotation axis, a radial direction that defines a radially outer direction when going away from said axial direction, a radially inner direction when going towards said axial direction, and a circumferential direction perpendicular to said axial direction and said radial direction, said brake disc also comprising a drum including a drum connection flange that has a connection portion suitable for connecting said drum to a wheel bearing, said connection portion comprising a surface facing the wheel bearing and an opposite surface facing said connection flange, said brake disc being arranged with its connection flange positioned between the wheel bearing and said connection flange, said drum also comprising an edge portion that is arranged radially outside of said connection portion and that is suitable for connecting said drum to the wheel bearing, said drum also comprising a drum body that connects said edge portion to said brake band, said drum body defining an outer space comprised between said drum and the wheel rim, said drum body being suitable for creating a gap between said drum and the wheel bearing housed in said drum, said gap running axially according to said axial direction substantially along the entire drum until it reaches said edge portion, wherein said edge portion defines at least one drum opening that places said gap present between said drum body and the wheel bearing in communication with a space outside of said drum, said drum opening having an opening edge that includes a radially inner portion; and wherein said radially inner portion of said opening edge of at least one of said through openings of said connection flange is substantially radially aligned with said radially inner portion of said opening edge of said at least one drum opening.

2. The assembly according to claim 1, wherein said at least one drum opening comprises a plurality of drum openings distributed circumferentially around said rotation axis, wherein:

each said drum opening is joined to a drum duct having at least one wall inclined with respect to said rotation axis, said inclined wall being the radially outer wall with respect to said rotation axis of said brake disc;

each said drum duct is annular in shape and coaxial to said rotation axis;

each said drum opening is defined by opening walls that, in their radially outer portions with respect to said rotation axis of said brake disc, have at least one inclined section that defines said drum duct arranged between said gap and said opening, said drum duct radially widening creating a centrifugal action on a cooling fluid that is drawn from said gap towards said opening;

said at least one inclined section comprises a plurality of inclined sections having increasing inclination passing from said gap to said drum opening to form a channel that goes away from said rotation axis of said brake disc; and said opening walls defining said drum opening have at least one second wall section having a direction parallel to said axial direction, said section parallel to said axial direction being positioned opposite said inclined section to form an opening facing the outside of said brake disc with walls diverging from one another.

3. The assembly according to claim 1, wherein said brake disc is for use in a commercial vehicle and wherein said drum of said brake disc is cup-shaped and said brake band of said brake disc is annular, wherein:

said drum has an annular ridge that extends from an outer peripheral surface of said drum, said annular ridge forming at least one guide duct that guides cooling fluid from said gap to said space outside of said drum.

4. The assembly according to claim 1, wherein:

said connection flange has a number of through openings that is equal to the number of drum openings, said through openings and said drum openings having a radially inner opening portion thereof aligned with each other on the same cylindrical surface substantially equally spaced from said rotation axis;

said through openings and said drum openings have a same tangential or circumferential extension along a tangential or circumferential direction;

said assembly comprises said connection flange, said brake disc, and the wheel bearing, and wherein said brake disc is connected to said wheel bearing with stud bolts received in threaded seats of a body of said wheel bearing so as to enable separation of said connection flange from said brake disc; and said stud bolts are received in said threaded seats so as not to project from said brake disc to prevent said stud bolts from being able to interfere with coupling between said brake disc and said connection flange.

5. The assembly according to claim 1, wherein:

said disc coupling portion of said connection flange forms a seat suitable for receiving said drum connection flange; and said disc coupling portion is internally radially defined by a disc guide edge for guiding and centering said drum connection flange.

6. The assembly according to claim 1, Wherein;

said rim coupling portion of said connection flange forms a rim seat suitable for receiving a portion of a rim flange; and said rim coupling portion is internally radially defined by a rim edge for guiding and centering the rim flange.

7. The assembly according to claim 1, wherein:

said assembly further comprises a wheel rim and wherein said wheel rim comprises a channel suitable for cooperating with a tire and a rim flange suitable for connecting said channel with said rim flange; and said rim flange is equipped with rim through openings to evacuate cooling fluid.

8. A method comprising:

mounting a flange-disc assembly to a bearing, comprising the steps of:

providing the assembly as defined in claim 1;

fitting the brake disc over the wheel bearing by inserting the wheel bearing inside the drum of the brake disc until the connection flange of the drum is brought into contact with the wheel bearing;

aligning a seat for a stud bolt and firmly connecting the brake disc to the wheel bearing;

fitting the connection flange by coupling its inner flange ring with the brake disc; and firmly connecting the connection flange to the brake disc and to the wheel bearing using flange-disc-bearing connection means.

9. The method of claim 8, further comprising connecting a wheel rim to the connection flange, comprising the steps of:

fitting a wheel rim flange on the outer ring of the connection flange; and firmly connecting the wheel rim and the connection flange together using rim and flange connection means.

10. The method of claim 9, further comprising replacing the brake disc, comprising the steps of:

preventing the wheel rim from being decoupled from the connection flange;

preventing the flange-disc-bearing connection means from being disconnected by separating the connection flange from the brake disc;

subsequently disconnecting the brake disc from the wheel bearing by unscrewing the stud bolts; and withdrawing the brake disc from the wheel bearing.

11. An assembly comprising:

a connection flange and a brake disc, wherein said brake disc has a brake band and a drum, said drum having an outer drum surface, said drum being suitable for receiving a wheel bearing inside said drum, said brake disc being arranged between the wheel bearing and said connection flange and wherein said connection flange comprises an inner ring coupled with said brake disc and an outer ring able to be coupled with a wheel rim, said connection flange also comprising an intermediate portion having through openings, each through opening comprising a radially inner edge portion that is positioned radially inward of said outer drum surface at a point at which said inner ring of said connection flange is coupled to said drum.

12. The assembly according to claims 11, wherein:

said outer drum surface is an outer surface of a drum edge and a connection portion between a drum flange and a drum body portion that connects said drum flange to said brake band; and said entire outer drum surface is arranged radially outside of said radially most inner edge portions of said through openings.

\* \* \* \* \*